Oct. 3, 1950            J. R. WEST            2,524,151
FEEDING CONTROL MEANS FOR HARVESTERS
Filed March 1, 1946
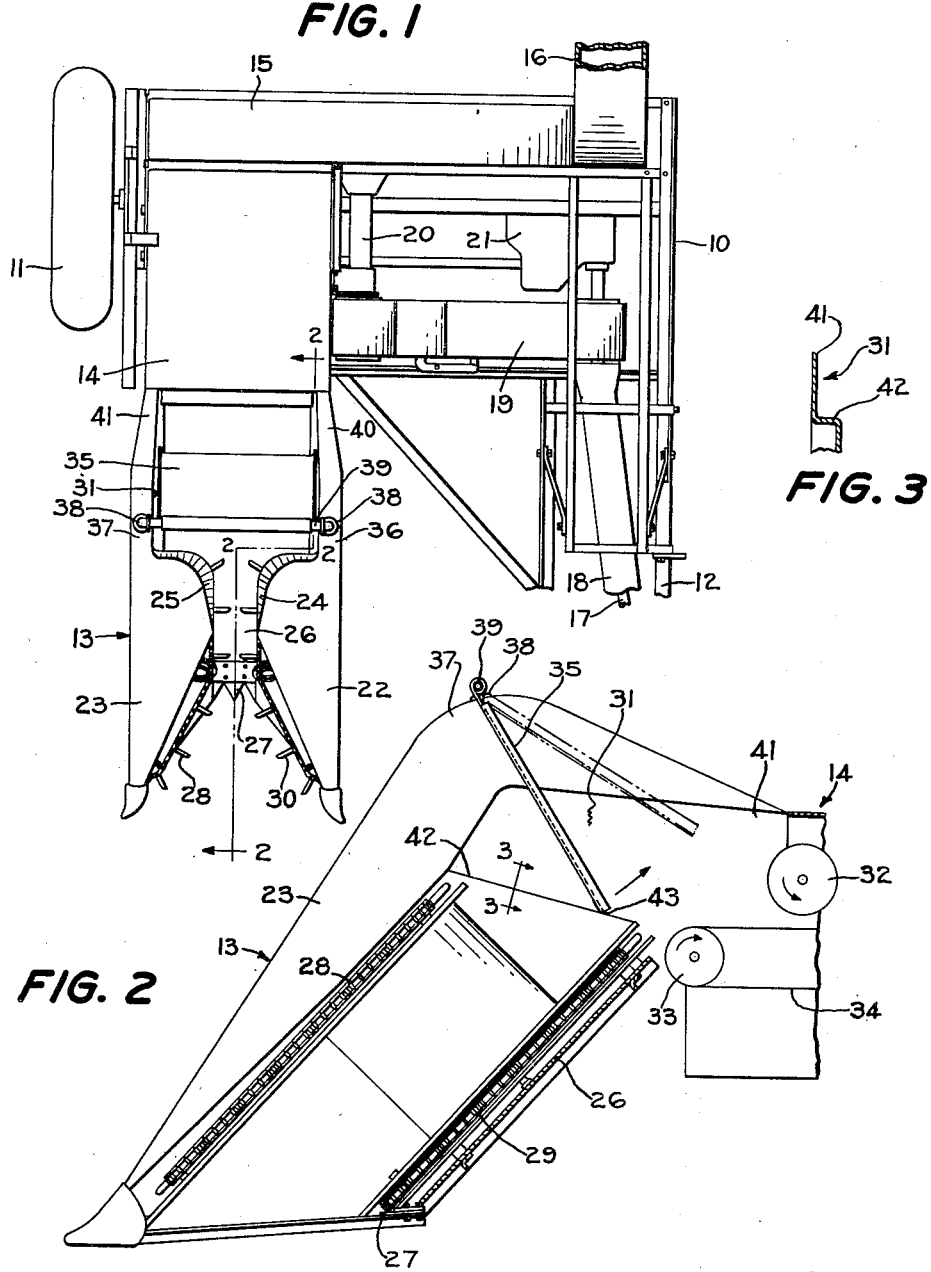
INVENTOR.
JAMES REX WEST
BY
ATTORNEYS Patented Oct. 3, 1950

2,524,151

UNITED STATES PATENT OFFICE 2,524,151

FEEDING CONTROL MEANS FOR HARVESTERS

James Rex West, Ottumwa, Iowa, assignor to Deere Manufacturing Co., Dubuque, Iowa, a corporation of Iowa Application March 1, 1948, Serial No. 12,235

7 Claims. (Cl. 56—119)

This invention relates to a harvester or like crop gathering machine and more particularly to such machines adapted to harvest or gather stalks standing in rows.

The ensilage harvester is typical of a machine in which the present invention provides an improvement. The ordinary type of ensilage harvester includes a wheeled frame that is propelled over the ground and has gathering mechanism for operating on standing stalks growing in rows. The gathering mechanism includes a forwardly disposed stalk-severing means behind which is located a rearwardly extending stalk passage including means for moving the stalks rearwardly from the severing means to receiving means in which is located mechanism for reducing the stalks by cutting same into relatively short lengths. The junction between the stalk passage and the receiving means is ordinarily in the form of a feed throat and includes mechanism for receiving the severed stalks from the stalk passage and delivering such stalks to the reducing mechanism. After the stalks are severed and are carried up the stalk passage, it is desirable that they be presented butt end first to the feeding mechanism, and for this purpose the conveying means in the stalk passage is constructed and arranged to carry the stalks upwardly and rearwardly in generally upright position—with their butt ends down—so that when the butt ends reach the end of the stalk passage they will theoretically enter the feed throat butt end first. However, it is found that the theoretical results are not always obtainable, mainly because of the variations in height to which the stalks grow and to packing and tangling of the stalks because of the relatively heavy foliage thereon.

According to the present invention, there is provided means for controlling the transfer of stalks from the stalk passage to the feeding mechanism, this means preferably taking the form of a retarder element that operates to retard the upper portions of the stalks while permitting the butt portions to proceed. An important object of the invention is to provide the retarder element in the form of a swinging or yieldable device that will accommodate stalks of varying lengths. Another object is to arrange the retarder element in the feed throat in such manner that it will provide a temporary or yieldable barrier which can swing rearwardly in response to pressure exerted by the moving stalks, the element depending to a point sufficiently low to be engaged by short lengths of stalks. A further object of the invention is to provide the retarder element in the form of an inclined door and to pivot same so that its own weight will keep it in a lowered position from which it can move rearwardly and upwardly as the stalks engage it. A still further object of the invention is to provide the retarder element as means that can be readily attached to existing machines of the type referred to.

Other important objects and desirable features inherent in and encompassed by the invention will become apparent to those skilled in the art as the disclosure is more fully made of a preferred embodiment of the invention as set forth in the following detailed description and as illustrated in the accompanying sheet of drawings, in which:

Figure 1 is a general plan view of a machine of the ensilage harvester type;

Figure 2 is an enlarged longitudinal sectional view taken substantially on the line 2—2—2—2 of Figure 1; and Figure 3 is a fragmentary cross sectional view taken on the line 3—3 of Figure 2 and showing a portion of the structure which provides a stop or limit means for the retarder element.

The invention is illustrated here as an attachment for or improvement on an ensilage harvester of well known construction such as is shown in assignee's co-pending application, Serial No. 555,716, filed September 25, 1944, by Miles H. Tuft. It should be understood, however, that the invention is not limited to that particular type of machine and that the present disclosure is merely representative of many forms that the invention may assume.

The machine or harvester illustrated is shown as having a main frame 10 carried on a pair of ground wheels 11 (only one of which is shown) and having a forwardly directed hitch frame portion 12 means of which the harvester may be connected to a tractor or other draft vehicle in the usual manner. The forward right hand portion 12 by means of which the harvester may designated generally by the numeral 13, which operates in the usual manner to gather stalks or similar crop and convey the same rearwardly to feeder mechanism contained in the housing 14 which is disposed ahead of a housing 15 containing the usual reducing mechanism (not shown). The left hand end of the housing 15 is shown as being connected to a discharge pipe 16 by means of which the reduced stalks or other crops are conveyed out of the reducing housing 15.

The operating parts of the machine may be conveniently driven by means of a rearwardly extending propeller shaft 17 appropriately shielded at 18 and connected by a transverse belt 19 to a shaft 20 for driving the rotor (not shown) in the reducing housing 15. The driving mechanism further includes a gear housing 21 from which drives may be taken to other operating parts of the harvester, the details of which have not been shown inasmuch as they are familiar and conventional.

The gathering unit may be of any well known type and is here shown as including inner and outer gathering sheets 22 and 23, which respectively have generally vertical side portions 24 and 25 connected at their lower ends to a rearwardly and upwardly inclined bottom or butt pan 26. The forward or lower end of the bottom 26 is rearwardly adjacent stalk-severing means which may include a knife or sickle 27 of any well known type. Gathering and forwarding devices operate within the passage formed by the wall portions 24 and 25 and the inclined bottom 26. These devices may include upper and lower gathering chains 28 and 29 at the right hand side of the stalk passage and a similar pair of chains at the left hand side of the passage, only the upper one of which is visible at 30 in Figure 1.

The gathering sheets 22 and 23 are rather widely spaced apart at their forward ends and converge rearwardly to the relatively narrow stalk passage. The upper gathering chains extend forwardly of the lower gathering chains and the chains are driven at such relative speeds that the stalks are carried up the stalk passage with their butt ends down or riding on the butt pan or bottom 26. The upper chains terminate at their upper ends a short distance forwardly of the upper ends of the lower chains so that the butt ends of the stalks will be slightly advanced with respect to the upper portions of the stalks at the rear or upper end of the stalk passage. The stalk passage at this point merges into or forms a junction with a feed throat 31 disposed ahead of the feeder house 14. The throat 31 is substantially co-extensive in width with respect to the feeder house 14 but is substantially wider than the relatively narrow stalk passage defined by the gatherer unit portions 24, 25 and 26. Consequently, when the stalks reach the upper end of the stalk passage, in which they were relatively confined, they may spread out laterally to facilitate feeding to the mechanism in the feeder house 14. The means for receiving the stalks from the stalk passage and for ultimately conveying same rearwardly to the mechanism in the reducing housing 15 may be of any conventional construction and is here shown as including an upper feed roll 32 which operates above and in conjunction with a lower feeding means including a roller 33 and endless belt 34.

As stated above, the theoretical result that should be obtained when the stalks reach the end of the stalk passage and are delivered through the throat 31 to the feeder house 14 is that the stalks should lie horizontally and longitudinally with their butt ends to the rear to be received between the feeder parts 32 and 34. However, because of the variation in stalk length, a large percentage of stalks will not conform to this pattern and cause tangling and packing of the other stalks, leading ultimately to clogging of the feeding mechanism. It has heretofore been proposed in some instances to place a permanent barrier or obstacle across the feed throat 31 to engage and retard the upper ends of stalks so that these upper ends will be pitched forwardly in trailing relation to the leading butt ends. Although this expedient works well in instances where the stalks are sufficiently long to be engaged by such barrier, there was still the problem of handling the shorter stalks that would escape beneath such barrier. According to the present invention there is provided means forming a temporary or yieldable obstruction or barrier in the feed throat of such size and so arranged as to control the feeding of all stalks regardless of length. The preferred form of this means as shown in the drawing comprises a retarder element in the form of a plate or door-like member 35 which is preferably constructed of sheet metal and is of rectangular shape, thus having substantial vertical and transverse dimensions and consequently being of such substantial area as to provide a barrier at the junction of the stalk passage and throat. The side sheets 22 and 23 of the gathering unit 13 extend upwardly and provide portions 36 and 37, respectively, at opposite sides of the feed throat 31 substantially at the junction between the feed throat and the stalk passage and at a substantial height thereabove. The portions 36 and 37 are in transverse alignment and carry a pair of transversely aligned bracket or bearing members 38 which receive opposite ends of a transverse hinge pin 39. The retarder element or door 35 depends from the axis of the hinge pin 39 to a point relatively close to the upper end of the inclined butt pan 26. The door is preferably imperforate and its length and width are such that it substantially separates the stalk passage from the feed throat 31.

The feed throat 31 is defined at opposite sides by side sheets 40 and 41, which are preferably rearward extensions respectively of the gatherer sheets 22 and 23. Each of the sheet portions 40 and 41 is provided with an inwardly directed offset portion 42 (Figures 2 and 3) which forms a substantially horizontal ledge generally at the upper end of the stalk passage. The retarder door 35 is of such length that the lower portions thereof normally rest on the ledge, as at 43 (Figure 2). The plane of the door 35 is thus inclined at an acute angle to the horizontal; or, at an angle substantially normal to the plane of the butt pan 26. Since the hinge axis at 39 is forwardly of the lower portion 43 the door 35 will, by virtue of its own weight, naturally assume the full line position shown in Figure 2, the portions 42 and 43 forming interengageable members for this purpose. Since the hinge axis provides a yieldable mounting structure for the door, the door may swing rearwardly and upwardly, as indicated in broken lines in Figure 2.

In the operation of the harvester equipped with the retarder means described above, stalks or similar crops are gathered and severed in the usual manner and moved upwardly and rearwardly in the stalk passage defined by the gatherer parts 24, 25 and 26. When the stalks reach the upper end of the passage they encounter the yieldable door 35. The stalks are in generally upright position, butt ends down, as they travel up the stalk passage and the vertical extent of the door 35 is such that it will engage short and tall stalks alike, thus deflecting the upper end portions of such stalks forwardly so that they trail the leading butt ends, whereby the stalks will be delivered butt ends first under or past the door to the feeding mechanism parts 32 and 34. The weight of the door 35 will tend to depress the rear end portions, or upper ends, of the stalks and the general result will be that the stalks are delivered to the feeding mechanism while lying substantially longitudinally and horizontally according to the theoretical result to be expected. The use of the door 35 makes the theoretical result an actual result in practice and proper feeding of the stalks through the feeding mechanism is assured.

The construction of the retarder means is such that it may be readily attached to machines of existing types, it being necessary only to provide the door, hinge pin 39, and bearing brackets 38, and to mount this structure as indicated above. Although the door here shown is of imperforate construction so that it may be readily constructed of sheet metal and so that it will have the necessary weight to provide the adequate retarding action on the stalks, it may obviously assume other forms. Likewise, numerous other modifications and alterations may be made in the preferred form of the invention illustrated without departing from the spirit and scope of the invention as defined in the appended claims.

What is claimed is:

1. In a row crop harvester adapted to be moved along a row of standing stalks and having frame structure and gathering mechanism including stalk-severing means and a pair of laterally spaced and rearwardly extending side elements and a rearwardly extending bottom forming a stalk passage through which severed stalks are moved butt ends down from the stalk severing means to a rearwardly disposed stalk-receiving means having a feed throat forming a stalk-receiving junction with the stalk passage: the improvement residing in means for controlling the delivery of stalks butt ends first through the feed throat to the stalk-receiving means, comprising a retarder element extending generally transversely and vertically into the feed throat substantially at the junction of the stalk passage and feed throat and being of substantial area to form a barrier at the junction; and means hinging the retarder element at an upper portion thereof for longitudinal swinging toward and away from the feed throat, including a transverse hinge axis disposed at a substantial height above the general level of the stalk passage bottom.

2. The invention defined in claim 1, further characterized in that: means are provided including interengageable members on the retarder element and the harvester frame structure for limiting forward swinging of said retarder element.

3. In a row crop harvester adapted to be moved along a row of standing stalks and having frame structure and gathering mechanism including stalk-severing means and a pair of laterally spaced and rearwardly extending generally vertical side walls and a rearwardly extending bottom forming a stalk passage in which are located generally vertically spaced upper and lower stalk-moving chains by means of which severed stalks are moved butt ends down from the stalk-severing means to a rearwardly disposed stalk-receiving means having a feed throat forming a stalk-receiving junction with the stalk passage: the improvement residing in means for controlling the delivery of stalks butt ends first through the feed throat to the stalk-receiving means, comprising a retarder element extending generally transversely across the junction of the stalk passage and feed throat; and further extending vertically from a lower portion generally at the level of the lower stalk-moving chain to an upper portion disposed at a height substantially above the general level of the upper stalk-moving chain; and means hinging the retarder element at an upper portion thereof for longitudinal swinging toward and away from the feed throat, including a transverse hinge extending through the upper portion of said retarder element and carried on the stalk passage side walls.

4. In a crop-gathering machine having a frame structure adapted to be moved over the ground, including crop-gathering means and means including a crop passage for moving gathered crops rearwardly to a crop-receiving means having a feed throat forming a crop-receiving junction with said passage: a crop-retarder attachment comprising a transverse, upwardly extending element of substantial vertical and transverse dimensions swingably carried at an upper portion thereof by the frame structure on a transverse mounting structure above the junction of the crop passage and throat and depending into the feed throat substantially at said junction to dispose a lower portion thereof for rearward yielding in the path of crops moving from said passage to said throat.

5. In a crop-gathering machine having a frame structure adapted to be moved over the ground to gather crops therefrom and including a pair of laterally spaced side portions and a rearwardly and upwardly inclined bottom portion defining a crop passage along which crops are moved upwardly and rearwardly to a crop-receiving means having a feed throat forming a crop-receiving junction with said passage: the improvement residing in crop control means, comprising a door-like element carried on a hinge axis disposed transversely of the feed throat substantially at the junction thereof with the crop passage and at a substantial height above said junction said element extending substantially across the throat generally at said junction and depending from said hinge axis normally at a rearward and downward inclination to the crop passage bottom portion but yieldable rearwardly about said hinge axis.

6. In a crop-gathering machine having a frame structure adapted to be moved over the ground to gather crops therefrom and including a pair of laterally spaced side portions and a rearwardly and upwardly inclined bottom portion defining a crop passage along which crops are moved upwardly and rearwardly to a crop-receiving means having a feed throat forming a crop-receiving junction with said passage: the improvement residing in crop control means, comprising a yielding barrier element disposed across the feed throat substantially at the junction of said throat and the crop passage and having a lower portion proximate to the general plane of the crop passage bottom and extending in its normal position forwardly and upwardly at an acute angle to the horizontal to an upper portion at a substantial height above said plane; and means mounting said element on a portion of the machine structure for rearward yielding of the element in response to pressure of crops moving from the crop passage to the feed throat and for return of said element to its normal position.

7. In a row crop harvester adapted to be moved along a row of standing stalks and having frame structure including stalk-severing means and a pair of laterally spaced side walls and a rearwardly and upwardly inclined bottom wall which defines a rearwardly and upwardly inclined passage along which stalks are moved butt ends down from the stalk-severing means to a stalk-receiving means disposed rearwardly of the stalk passage and having a feed throat providing a stalk-receiving junction with said passage: the improvement residing in means for controlling the delivery of stalks butt ends first through the feed throat to the receiving means, comprising a door-like element carried on a hinge axis disposed transversely of the feed throat substantially at the junction thereof with the stalk passage and at a substantial height above said junction said element extending substantially across the throat generally at said junction and depending from said hinge axis normally at a rearward and downward inclination to the stalk passage bottom portion but yieldable rearwardly about said hinge axis.

JAMES REX WEST.

REFERENCES CITED

The following references are of record in the file of this patent:

UNITED STATES PATENTS

| Number | Name | Date |
|---|---|---|
| 906,868 | Gasser | Dec. 15, 1908 |
| 963,270 | Blakley | July 5, 1910 |
| 1,041,205 | Vraalstad | Oct. 15, 1912 |
| 1,172,114 | Debaker | Feb. 15, 1916 |